(12) United States Patent
Oppl

(10) Patent No.: US 10,838,903 B2
(45) Date of Patent: Nov. 17, 2020

(54) DEDICATED OR INTEGRATED ADAPTER CARD

(71) Applicant: Xephor Solutions GmbH, Purkersdorf (AT)

(72) Inventor: Konstantin Oppl, Purkersdorf (AT)

(73) Assignee: Xephor Solutions GmbH, Purkersdorf (AT)

( * ) Notice: Subject to any disclaimer, the term of this patent is extended or adjusted under 35 U.S.C. 154(b) by 337 days.

(21) Appl. No.: 15/887,633

(22) Filed: Feb. 2, 2018

(65) Prior Publication Data

US 2019/0243795 A1   Aug. 8, 2019

(51) Int. Cl.
| | |
|---|---|
| *G06F 9/46* | (2006.01) |
| *G06F 13/40* | (2006.01) |
| *G06F 13/16* | (2006.01) |
| *G06F 9/50* | (2006.01) |
| *G06F 13/42* | (2006.01) |

(52) U.S. Cl.
CPC .......... *G06F 13/4068* (2013.01); *G06F 9/505* (2013.01); *G06F 13/1663* (2013.01); *G06F 13/4282* (2013.01)

(58) Field of Classification Search
CPC .. G06F 13/4068; G06F 9/505; G06F 13/1663; G06F 13/4282
See application file for complete search history.

(56) References Cited

U.S. PATENT DOCUMENTS

| | | | |
|---|---|---|---|
| 8,527,970 B1 * | 9/2013 | Luecke | G06F 8/451 717/140 |
| 2011/0131558 A1 * | 6/2011 | Young | G06F 8/314 717/145 |
| 2012/0110303 A1 * | 5/2012 | Dhanwada | G06F 9/52 712/29 |
| 2015/0007187 A1 * | 1/2015 | Shows | G06F 9/5088 718/104 |

* cited by examiner

*Primary Examiner* — Wissam Rashid
(74) *Attorney, Agent, or Firm* — Whitmyer IP Group LLC

(57) ABSTRACT

An adapter card including a processing unit, an assigned memory and a system bus interface are disclosed. The system bus interface is connectable to at least one system bus of a primary computer system providing a connection to a number of at least one central processing units of the primary computer system, the number of at least one central processing units providing a plurality of processing entities. Configuration data stored in the assigned memory includes data defining all processing entities of all central processing units of the central computer system. The adapter card is operative to perform computations including: obtaining a system object representing a callable unit of a program from a program environment, transforming the system object into a plurality of threads, each thread being executable by one processing entity, assigning each thread to one processing entity, and transmitting each thread to the assigned processing entity for execution.

19 Claims, 3 Drawing Sheets

DEDICATED OR INTEGRATED ADAPTER CARD

TECHNICAL FIELD

The present teachings relate generally to parallel computing, and more particularly to adapter cards (e.g., dedicated, integrated, etc.) for forming computer grid structures.

BACKGROUND

To increase the hardware power, modern computers utilize a plurality of parallel CPUs (Multi-CPU), usually having multiple cores (Multi-CORE) which can be adapted to handle a plurality of parallel threads of execution in one core (Multi-Hardware-Threads). To increase the calculation power even more, a plurality of computers can be connected over local or wide area networks to form a grid to enable high performance computing. Complex computational tasks can be calculated in a parallel manner on a plurality of computers connected in a grid.

To deploy the full hardware power of such computer systems and grids computer programs have to be "tailored" for specific computer or grid architecture. There are several tools and methods for implementing a parallel execution, which are defined in parallel execution models, e.g. POSIX threads, JAVA threads, more object oriented methods like boost library, which are difficult to handle also for a talented and experienced programmer. Other approaches that could be easier to handle, like JAVA and .NET solutions, are actually unacceptable for most high performance computing tasks, as they are by default to slow.

Therefore many problems arise from parallel computing in real world programming, e.g. that a diligently designed software is not running with the right performance or that a program is not scalable over nodes in a grid, CPUs in a node, or Cores in a CPU. Software systems for parallel execution often have a high defect rate, are hard to reuse or debug, etc.

SUMMARY

The needs set forth herein as well as further and other needs and advantages are addressed by the present embodiments, which illustrate solutions and advantages described below.

Current solutions are working with direct usage of parallelization technologies, like threads, processes, semaphore, shared memory, mutex, OpenMPI, OpenMP, etc., by using different system implementations mentioned above. This approach usually creates an unreliable code, which has a high defect rate, stays below the expectations of performance, and leads mostly to an unreadable code, which is hard to attain or to extend.

It is a goal of the present teachings to provide apparatus and methods to improve parallel computing solutions and in particular to reduce the defect rate and increase the scalability and portability of programs running on parallel computer systems.

In a first aspect, these goals are achieve by an adapter card having a processing unit, an assigned memory, and a system bus interface. The system bus interface is connectable to at least one system bus of a primary computer system providing a connection to a number of at least one central processing units of the primary computer system, the number of at least one central processing units providing a plurality of processing entities. Configuration data stored in the assigned memory comprises data defining all processing entities of all central processing units of the primary computer system. The adapter card is operative to perform computations comprising the following:

obtaining a system object representing a callable unit of a program from a program environment,
  transforming the system object into a plurality of threads, each thread being executable by one processing entity,
  assigning each thread to one processing entity,
  transmitting each thread to the assigned processing entity for execution,
  receiving computation results from each processing entity,
  determining an outcome of the system object based on the computation results,
  returning the outcome to the program environment.

Other embodiments of the system and method are described in detail below and are also part of the present teachings.

BRIEF DESCRIPTION OF THE DRAWINGS

The present teachings will further be described in terms of non-restricting examples of preferred embodiments, which are given in connection with the accompanying drawings, wherein.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc., in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

Figure 1:
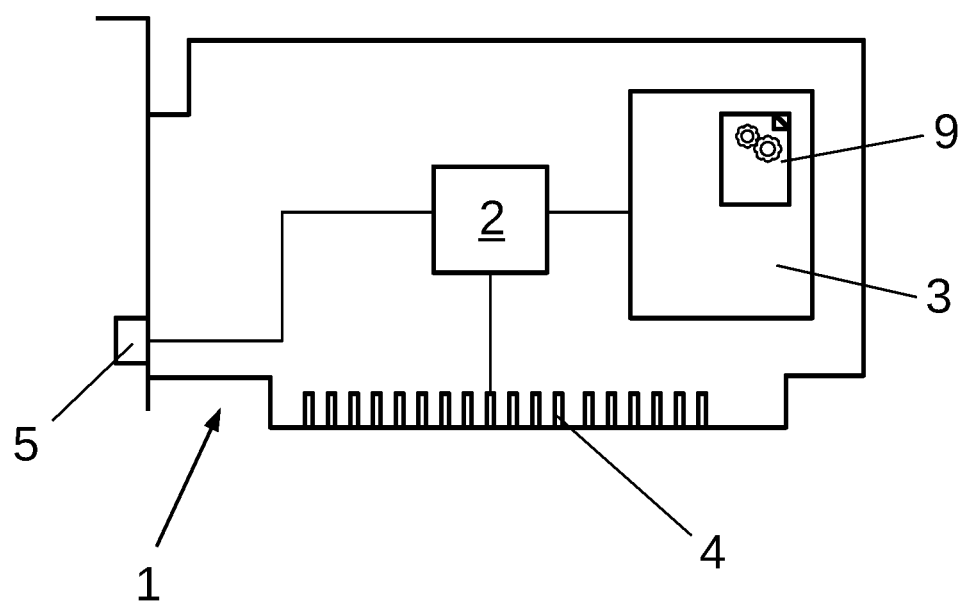
FIG. 1 depicts an adapter card according to the present teachings in a schematic representation.

FIG. 1 shows an inventive adapter card 1 comprising a processing unit 2, an assigned memory 3, a network interface 5, and a system bus interface 4.

The adapter card 1 can be implemented as a dedicated (or discrete) adapter card 1, which is a physical hardware unit e.g. in form of an expansion card, expansion board or accessory card. The dedicated adapter card 1 may comprise a printed circuit board that has a system bus interface 4 to be inserted into an electrical connector, or expansion slot on a computer motherboard, backplane or riser card to add functionality to the computer system. The processing unit 2, the memory 3, and the network interface 5 may be provided on the printed circuit board, e.g. in the form of an electronic circuit and integrated circuit elements. The electrical connectors of the system bus interface 4 can provide connectivity to the system bus of the computer system either directly or via a card bus or expansion bus according to well-known standards.

The adapter card 1 can also be implemented as an integrated or "virtual" adapter card, i.e. the elements of the adapter card 1 are integrated into the motherboard of the computer system. In this case the function of processing unit 2 of the adapter card 1 can be performed by the CPU of the computer system and the dedicated memory 3 can be a part of the computer memory. The readily existing connection of the CPU to the system bus can be used as the system bus interface 4. As a network interface 5 any network interface available on the computer system can be used. The embodiment as an integrated adapter card 1 allows for a software implementation of the inventive adapter card 1 on a variety of suitable computer hardware.

The network interface 5 provides a data connection to remote hardware units using a suitable network protocol, for example a network protocol of the internet protocol suite, such as TCP/IP or UDP/IP. Nonetheless the present teachings are not restricted to these protocols and any network protocol known in the art can be used.

Figure 2:
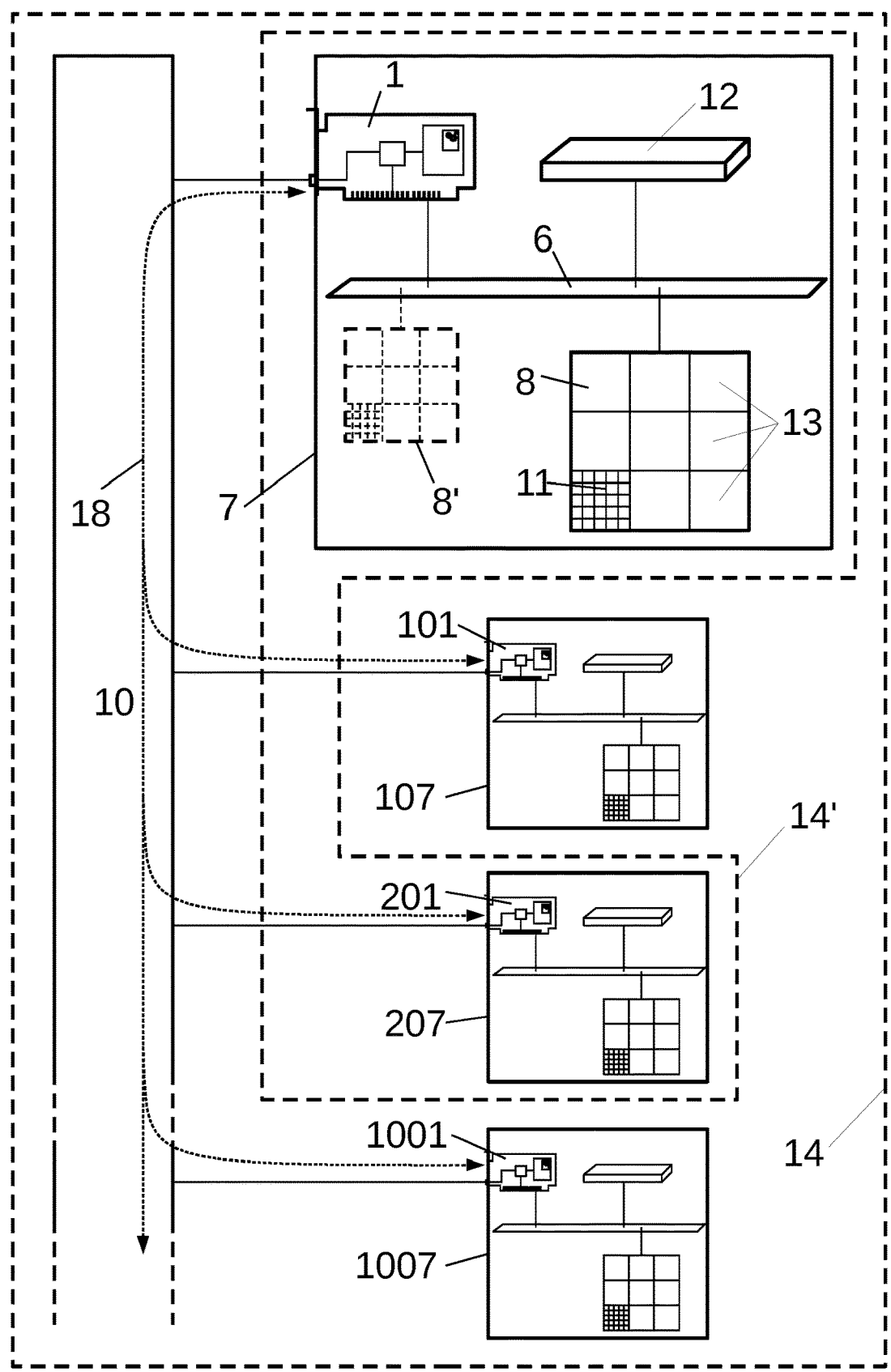
FIG. 2 shows a schematic overview over a grid-computing infrastructure.

FIG. 2 shows an exemplary distributed system or grid computing structure 14 that can be used according to the present teachings.

A primary computer system 7 is provided with the (dedicated or integrated) adapter card 1, which is connected to a system bus 6 of the computer system 7 via the system bus interface 4. The primary computer system 7 has at least one central processing unit (CPU) 8, also connected to the system bus 6 in a known manner. Also at least one computer memory 12 is connected to the CPU 8 and the adapter card 1 via the system bus 6.

The CPU 8 provides a number of processing entities 11 to the operating system of the computer system 7. The term "processing entity" as it is used in the context of this disclosure describes the smallest entity of a CPU that can independently read and execute program instructions. Each processing entity 11 appears to the operating system as an independent processor that can be addressed in a parallel manner.

Each CPU 8 provides at least one processing entity 11, but in the context of high performance computing modern computer systems usually have more than one processing entity 11. For example the CPU 8 can be a multicore-processor having a plurality of cores 13. A core is an independent actual processing unit within the CPU 8 that can read and execute program instructions independently from other cores of the CPU 8. Further each core 13 can allow multi-threading, i.e. one physical core appears as multiple processing entities 11 to the operating system, sometimes referred to as "hardware threads". In other cases each core 13 of the CPU 8 can be a single processing entity 11 or the CPU 8 itself can be a single processing entity 11.

The primary computer system 7 can additionally have one or more secondary CPUs 8', one of which is schematically shown in FIG. 2 in dotted lines. The secondary CPU 8' (and any further secondary CPU, as the case may be) can essentially have the same features as the first CPU 8 and provides one or more processing entities 11' in one or more cores 13'.

The network interface 5 provides a connection to a number of remote computer systems 107, 207, 1007 via a network 10. In FIG. 2 a first remote computer system 107, a second remote computer system 207 and a tenth remote computer system 1007 are shown in an exemplary manner and it should be noted that any number of computer systems can be used in connection with the inventive systems and methods. Each of the remote computer systems 101, 201, 1001 comprises one remote adapter card 101, 201, 1001, each of them being connected to the network 10 via their respective network interfaces 105, 205, 1005. All adaptor cards 1, 101, 201, 1001 can send and receive data via the network 10. The remote adapter cards 101, 201, 1001 can, independently from each other, be implemented as dedicated or integrated adapter cards.

The remote computer systems 107, 207, 1007 can be identical to or different from the primary computer system 7 and they particularly can have all features that are described above in connection with the description of the primary computer 7, e.g. a computer memory 112, 212, 1012, a system bus 106, 206, 1006. Each of the remote computer systems 107, 207, 1007 has at least one remote central processing unit 108, 208, 1008 providing at least one remote processing entity 111, 211, 1011. Some or all of the remote computer systems 107, 207, 1007 can additionally have one or more secondary CPUs (similar to the secondary CPU 8' of the primary computer system 7), which are not depicted in FIG. 2 for reasons of simplicity and clarity.

Returning to the detailed depiction of the adapter card in FIG. 1, the adapter card 1 comprises configuration data 9 which is stored in the assigned memory 3 of the adapter card 1. The configuration data 9 can, for example, be set up in the form of an .ini-file or another suitable data format.

The configuration data 9 defines the hardware environment of the adapter card 1, the number and communication addresses of all other remote adapter cards 101, 201, 1001 that are available in the grid computing structure 14 (see again FIG. 2) and the hardware environments of all remote computer systems 107, 207, 1007 in this grid computing structure 14. Further the configuration data 9 may comprise all necessary information needed by the adapter card 1 to address every single processing entity in the grid computing structure 14, either within the primary computer system 7 via the system bus 6, or within any other remote computer system 107, 207, 1007 in the grid via the network 10 and the respective remote adapter card 101, 201, 1001 which is connected to the respective system bus 106, 206, 1006 of the respective remote computer system 107, 207, 1007 via its own system bus interface.

The description herein describes a primary computer system 7 comprising a primary adapter card 1 and a plurality of remote computer systems 107, 207, 1007 each having a remote adapter card 101, 201, 1001. Nonetheless is obvious to the person skilled in the art that all adapter cards 1, 101, 201, 1001 could be essentially identical, so that each of the remote computer systems 107, 207, 1007, for example the second remote computer system 202, could be used as a primary computer system, in which case all other computer systems 7, 107 and 1007 in the grid computing structure 14 would act as a remote computer system. The distinction between "primary" and "remote" items is only given for comprehensibility and clarity of the description and should not be construed in a restrictive manner.

The configuration data 9 of an adaptor card 1 can comprise different definitions for a direct hardware environment and a remote hardware environment. The term "direct hardware environment" designates the hardware within the same computer system 7 as the respective adaptor card 1, in particular the CPUs 8, 8' and computer memory 12 that is connected to the adaptor card 1 via the system bus interface 4 of this adaptor card 1. Conversely, the term "remote hardware environment" designates all hardware entities that can be addressed via the network interface 5 and a remote adaptor card 101, 201, 1001, particularly the CPUs 108, 208, 1008 and computer memories of the remote computer systems 107, 207, 1007.

An identical set of configuration data 9 can be provided for all adaptor cards in the grid computing structure 14. In a different approach configuration data 9 stored in one adaptor card 1 is not identical to the configuration data 9 that is stored on the other adaptor cards 101, 201, 1001 in the grid computing structure 14. Nonetheless the configuration data of all remote adapter cards 1, 101, 201, 1001 in the same grid computing structure 14 may be consistent with each other in that they describe the same grid computing structure 14, i.e. the configuration data 9 provides detailed information of all processing entities 11, 111, 211, 1011 in the grid computing structure 14 to all (primary and remote) adapter cards 1, 101, 201, 1001.

It should be noted that the grid computing structure 14 is not defined by the units of hardware (i.e. computer systems 7, 107, 207, 1007) that are physically connected in the same network 10. This would obviously not be possible, for example in the case where the network 10 is the internet. Rather the grid computing structure 14 may be defined by one set of common configuration data 9 that is used by a number of adapter cards 1, 101, 201, 1001. This allows an easy change or modification of a grid computing structure 14. For example a second set of configuration data 9 could be shared by the primary adapter card 1 and the second remote adaptor card 201, which would define a grid computing structure 14' that comprises only the primary computer system 7 and the second remote computer system 207. Once it is defined, a grid computing structure 14, 14' can be reused for other software programs. New definitions for a new grid computing structure can be based on an existing definition as a template.

As will be understood by the following description of preferred methods of operation that can be implemented with the inventive systems the definition of the grid computing structure 14 can be chosen independently from the software program that is to be executed in a parallel manner by the grid computing structure 14. This allows the programmer of the software program to focus his efforts on the abstract parallelization strategies without taking into account existing hardware restrictions.

In the following, a general concept of a computer software structure shall be described in a generic manner with reference to FIG. 3. Independent of a specific programming language, any software program can be seen as a sequence f( . . . ) of program instructions, which can have a very complex structure. The sequence f( . . . ) can be structured into separate callable units $f_i$( . . . ) (i=1 . . . n) that perform a specific task. Callable units are often also referred to as subroutines, procedures, functions, routines, methods, or subprograms. By designing the structure and parameters of the callable units programmers create the software program.

Callable units are written according to a programming language. To be executed by the hardware of a computer system the callable units first have to be translated into a system object $O^{fi}$ containing object code, usually in a machine code language. This translation is known as compiling. Upon execution, this system object $O^{fi}$ is further transformed into a number of Threads of execution $O_k^{fi}$ (k=0 . . . m).

The term "thread of execution" (sometimes simply referred to as "thread"), as it is used in the context of this disclosure is defined as the smallest sequence of programmed instructions that can be managed by a scheduler of an operating system. In the context of the present disclosure each thread of execution will be executed by one processing entity 11.

Figure 3:
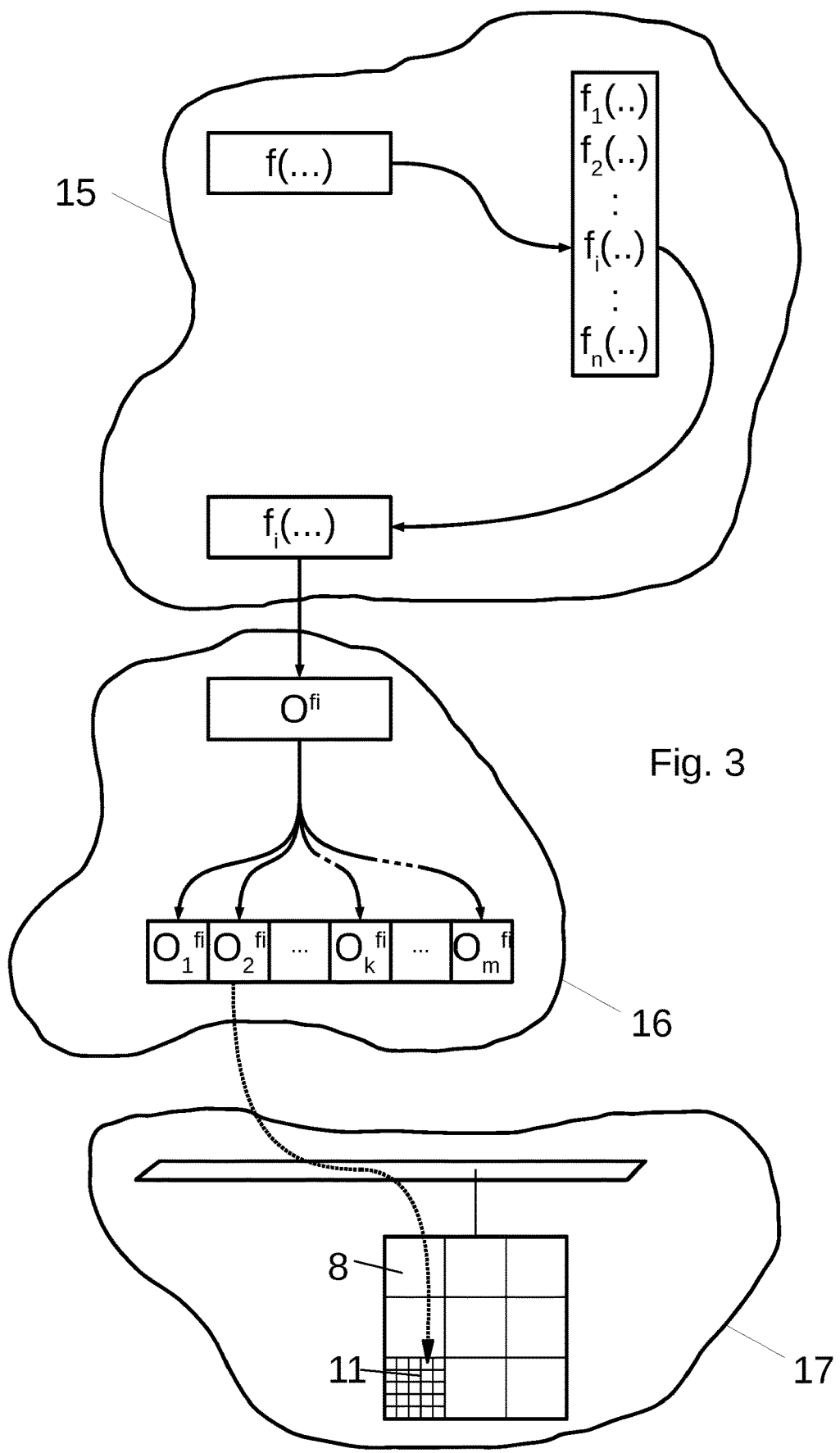
FIG. 3 shows a schematic block diagram illustrating the structure and execution of a software program.

In the context of the concept of computer software shown in FIG. 3, three domains can be established for the design and execution of computer programs: Firstly a software program environment 15, secondly a machine code environment 16 and thirdly a hardware environment 17.

To date for the development of software that is especially suitable for parallel computing, programmers have to take into account not only the software program environment 15, with which they are very familiar, but also the machine code environment 16 and the hardware on which the software runs, which often poses difficulties also to experienced programmers. The need to take into account the specific machine code environment 16 (and also a specific hardware environment 17) for the creation of the software (i.e. in the software program environment 15) inevitably results in complicated and bulky code. The effects that a change in the hardware environment 15 has on the performance of the software are often unpredictable so that the software has to be adapted every time the hardware environment 17 changes.

The present teachings allow a clear separation of the abstract parallelization of the algorithm and the execution of this software in the machine code environment 16 and hardware environment 17. The programmer creates the software program by defining and structuring the callable units. To define the abstract parallelization the programmer first analyses the problem domain and decides which callable units have to be active (autonomously running) and which callable units have to be passive (only attached to the active objects as e.g. data containers).

The term "abstract parallelization", as it is used in the context of the present disclosure, refers to the analyzation of the parallelization of an algorithm and the breakdown into a set of sub-algorithms that are designated as synchronous or asynchronous parallel algorithms. Particularly this can be done by code generation by defining the sub-algorithms as callable units.

The programmer defines the properties of the active callable units (for example what does the callable unit execute, which data are needed, etc.). He decides which active callable unit can be split in synchronously running sub processes or asynchronously running sub processes. He is doing only the abstract process of understanding the parallelization in a meta programming language, which can be close to the C++ or CORBA idl language. For example code generation can be done by a code generator, which reads the callable units and creates a ready to compile and link C++ class, which fits into an active system object adapter of the adapter card. The code generation "envelopes" the active callable units with the code that is understood by the adapter card.

Upon execution of the software program, the sequence f( . . . ) of callable units $f_i$( . . . ) gets translated into a set of system objects $O^{fi}$, that are defined in a form that can be processed by the adapter card 1.

The system objects $O^{fi}$ include all definitions of the abstract parallelization so that the adapter card 1 is able to understand the restrictions and mutual dependencies of the system objects and the protected shared data segments that are necessary for execution of the system objects.

Based on this information the adapter card 1 transforms the system objects $O^{fi}$ into a number of threads of execution $O_k^{fi}$. For example the threads of execution can be defined according to OpenMPI methods or as POSIX/Windows Threads. In other words, the component translates the information for the operating system and hardware system for execution. The transformation into threads of execution is done by algorithms that rely on the definitions of the abstract parallelization, i.e. for this step the adapter card 1 may not take into account the hardware resources that are available in the grid computing structure 14, but relies on the abstract parallelization defined by the programmer.

In the next step, which is the execution of the threads on a CPU, the actual available hardware resources have to be taken into account. According to the configuration data 9 the adapter card 1 receives status messages 18 from all remote adapter cards 101, 201, 1001 and sends respective status messages 18 to all the remote adapter cards 101, 201, 1001 in the grid computing structure 14. These status messages 18 contain data about the current work load and memory usage of the respective (primary or remote) computer system 7, 107, 207, 1007. The status messages 18 are preferably sent according to a regular scheme so that every adapter card 1, 101, 201, 1001 can maintain a current workload table in which workload and memory usage data of all computer systems in the grid computing structure 14 are recorded. Further "historic" data of the workload and memory usage can be stored in the same way, to provide an overview of the recent development of workload and memory usage in each computer system. The required length of the time period that historic data are preserved may depend on the prediction algorithms that are being used by the adapter card 1 to predict the future workload and memory usage which are described below. Usually a time period of some milliseconds time, e.g. less than 10 ms into the past, can be adequate to obtain satisfactory prediction results.

It is desirable to keep the actuality of the workload and memory usage data as close to real time as possible, especially by reducing any lags that can occur in the communication over the network 10. With a proper hardware infrastructure the current workload table can be maintained almost in real time. The maximum time lags of the system can be minimized by optimizing the hardware and the operation system.

Having structured the threads of execution and their interdependencies, the adapter card 1 may now predict the resources that will be necessary for the execution of each thread. Further the adapter card 1 may use a prediction algorithm to calculate a predicted workload of the processing entities 11, 111, 211, 1011 in the grid computing structure 14 and the respective memory usages of these processing entities for the near future. This allows for a prediction of the free capacities the processing entities will probably have. Known heuristic or deterministic prediction algorithms can be used for this prediction.

The adapter card now can map the necessary resources for execution of each thread to the predicted capacities of the processing entities. This mapping can be done by known algorithms, e.g. randomized algorithms that map the threads at least partly according to a random distribution, round-robin-algorithms that assign the threads according to a given order, etc.

According to this mapping the adapter card 1 assigns each thread $O_k^{fi}$ to one processing entity 11 in the grid computing structure 14 and transmits the threads $O_k^{fi}$ to the assigned processing entity 11 for execution. The processing entities 11 compute results and transmit the computed results back to the adapter card 1.

The adapter card 1 can either address a processing entity 11 within the primary computer system 7 directly via the system bus 6, or it can address a processing entity 111, 211, 1011 in one of the remote computer systems 107, 207, 1007 by transmitting the thread of execution to the remote adapter card 101, 201, 1001 in this computer system, although not limited thereto. The adapter card 1 can either transmit single threads of execution to the remote adapter cards, or it can transmit system objects that shall be executed by the respective remote computer system under the control of the respective remote adapter card, although not limited thereto.

The process of prediction of free resources and mapping of threads according to these predictions can be done in a highly dynamic manner, so that the adapter card 1 can react to changes of the workload that occur in one, more or all computer systems in real time, even while the execution of a program is already running.

The adapter card 1 distributes the system objects to and receives computation results from the processing entities 11. Further the adapter card 1 keeps track of all system objects and threads of execution in the way of a core process which keeps an overview over the distributed tasks.

According to the differently parallelized tasks of execution and the core process the adapter card 1 assembles the input and output data from the system objects and tasks and, where appropriate, assembles them with further tasks of execution from other system objects that are executed in a parallel manner.

In this way the system objects (or threads of execution, respectively) are executed on the assigned processing entities 11 and their execution is controlled by the core process running on the adapter card 1 through sending control signals. The techniques that can be used for the execution and organization of the parallel execution of threads and/or system objects are known per se in the state of the art. With knowledge of the teachings of this disclosure, the person skilled in the art is able to select and implement respective schemes and techniques.

The outcome of the execution is then returned to the program environment 15.

The definition of a grid computing structure 14, 14' can be created by the programmer independently from the software program to be executed. To "build" a grid computing structure 14, the adapter card 1 can for example read in a file containing the definition data 9 and send the definition data 9 to all remote adapter cards 101, 201, 1001 in the grid computing structure 14 that should be built up.

The creation of the grid computing structure 14 can also be defined in form of a configuration script within the software program that assigns parameters (like CPU, CORE or hardware thread ID or network address and port) and can be read by the adapter card 1 at the execution of the program. Although the configuration script is a part of the software program, it is to be noted that this definition is still independent from the abstract parallelization and can easily be changed without changing the abstract parallelization.

The use of configuration scripts could also allow for a use of different definitions of grid computing structures 14, 14' within one single software program, e.g. by defining different groups of callable units that can be performed in parallel, each group being allocated to a different grid computing structure 14, 14'. For the execution of the program the adapter card 1 can maintain two or more different grid computing structures 14, 14' while executing one software program.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

LIST OF REFERENCES adapter card 1
processing unit 2
assigned memory 3
system bus interface 4
network interface 5
system bus 6
primary computer system 7
central processing unit 8
configuration data 9
network 10
processing entity 11
computer memory 12
cores 13
grid computing structure 14
software program environment 15
machine code environment 16
hardware environment 17
status messages 18
program (f)
callable unit ($f_i$)
system object ($O^{f_i}$)
thread ($O_k^{f_i}$)

What is claimed is:

1. An adapter card comprising
a processing unit, an assigned memory, and a system bus interface,
wherein the system bus interface is connectable to at least one system bus of a primary computer system providing a connection to a number of at least one central processing units of the primary computer system, the number of at least one central processing units providing a plurality of processing entities,
configuration data stored in the assigned memory comprises data defining all processing entities of all central processing units of the primary computer system,
the adapter card being operative to perform computations comprising the following:
obtaining a system object representing a callable unit of a program from a program environment,
transforming the system object into a plurality of threads, each thread being executable by one processing entity,
assigning each thread to one processing entity,
transmitting each thread to the assigned processing entity for execution,
receiving computation results from each processing entity,
determining an outcome of the system object based on the computation results,
returning the outcome to the program environment
wherein the assigning each thread to one processing entity, transmitting each thread to the assigned processing entity for execution, receiving computation results from each processing entity, and determining an outcome of the system object based on the computation results include controlling data access to shared memory according to a parallel execution model.

2. The adapter card according to claim 1, wherein the system object comprises at least one parallelization definition and the transforming the system object into a plurality of threads is based at least in part on the parallelization definition.

3. The adapter card according to claim 1, wherein the assigning each thread to one processing entity is performed taking into account the configuration data.

4. The adapter card according to claim 1, wherein the adapter card is operative to receive current workload data representing a current workload of each processing entity and wherein the assigning each thread to one processing entity takes into account the current workload data.

5. An adapter card comprising
a processing unit,
an assigned memory,
a network interface, and
a system bus interface,
wherein the system bus interface is connectable to at least one system bus of a primary computer system providing a connection to a number of at least one central processing units of the primary computer system, the number of at least one central processing units providing a plurality of processing entities,
the network interface is adapted to provide a communication via a network to at least one of a number of remote adapter cards, each remote adapter card being connected to a system bus of a remote computer system having at least one remote central processing unit having at least one remote processing entity,
configuration data stored in the assigned memory comprises data defining all processing entities of all central processing units of the primary computer system,
the configuration data further comprises data defining all processing entities of all remote central processing units of all remote computer systems,
the adapter card being operative to perform computations comprising the following:
obtaining a system object representing a callable unit of a program from a program environment,
transforming the system object into a plurality of threads, each thread being executable by one processing entity,
assigning each thread to one processing entity,
transmitting each thread to the assigned processing entity for execution,
receiving computation results from each processing entity, determining an outcome of the system object based on the computation results, returning the outcome to the program environment wherein the assigning each thread to one processing entity, transmitting each thread to the assigned processing entity for execution, receiving computation results from each processing entity, and determining an outcome of the system object based on the computation results include controlling data access to shared memory according to a parallel execution model.

6. The adapter card according to claim 5, wherein the adapter card is operative to receive from at least one first remote adapter card status messages comprising current workload data that represent a current workload of the processing entities in the respective remote computer system.

7. The adapter card according to claim 5, wherein the adapter card is operative to send to at least one first remote adapter card status messages comprising current workload data representing a current workload of the processing entities of the primary computer system.

8. A method for executing a program that is defined as software stored on non-transitory computer readable media, the method performed by an adapter card having a processing unit, an assigned memory, a network interface, and a system bus interface, the adapter card executing the software to perform the following:

obtaining a system object representing a callable unit of a program from a program environment, transforming the system object into a plurality of threads, each thread being executable by one processing entity, assigning each thread to one processing entity, transmitting each thread to the assigned processing entity for execution, receiving computation results from each processing entity, determining an outcome of the system object based on the computation results, returning the outcome to the program environment wherein the assigning each thread to one processing entity, transmitting each thread to the assigned processing entity for execution, receiving computation results from each processing entity, and determining an outcome of the system object based on the computation results include controlling data access to shared memory according to a parallel execution model.

9. The method according to claim 8, wherein the system object comprises at least one parallelization definition and the transforming the system object into a plurality of threads is based at least in part on the parallelization definition.

10. The method according to claim 8, wherein the assigning each thread to one processing entity is performed taking into account configuration data stored in the assigned memory of the adapter card.

11. The method according to claim 8, wherein the adapter card receives current workload data representing the current workload of each processing entity and wherein the assigning each thread to one processing entity takes into account the current workload of each processing entity.

12. The method according to claim 8, wherein the adapter card receives from at least one first remote adapter card status messages comprising current workload data that represent a current workload of processing entities in a respective remote computer system.

13. A grid computing structure comprising a primary computer system and a number of at least one remote computer systems, the primary computer system and each remote computer system comprise an adapter card according to claim 5, wherein the network interfaces of the respective adapter cards are adapted communicate to other adapter cards via a network.

14. A computer, comprising:

the adapter card according to claim 1.

15. A grid computing structure comprising:

a plurality of the computer according to claim 14;

wherein the adapter cards for the plurality of computers are adapted communicate with each other via a network.

16. The grid computing structure of claim 15, wherein one of the plurality of computers includes a primary computer system and another of the plurality of the computers includes a remote computer system.

17. A computer, comprising:

the adapter card according to claim 5.

18. A grid computing structure comprising:

a plurality of the computer according to claim 17;

wherein the adapter cards for the plurality of computers are adapted communicate with each other via a network.

19. The grid computing structure of claim 18, wherein one of the plurality of computers includes a primary computer system and another of the plurality of the computers includes a remote computer system.

* * * * *